(12) United States Patent
Hyodo

(10) Patent No.: US 8,363,159 B2
(45) Date of Patent: Jan. 29, 2013

(54) ELECTRONIC APPARATUS

(75) Inventor: Yoshimasa Hyodo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 667 days.

(21) Appl. No.: 12/555,470

(22) Filed: Sep. 8, 2009

(65) Prior Publication Data

US 2010/0060782 A1    Mar. 11, 2010

(30) Foreign Application Priority Data

Sep. 9, 2008   (JP) ................. 2008-230894

(51) Int. Cl.
*H04N 5/225*     (2006.01)
*G03B 17/00*     (2006.01)
(52) U.S. Cl. .............. 348/373; 396/419
(58) Field of Classification Search .......... 348/373–376, 348/359; 396/419–428, 529, 530, 535, 354
See application file for complete search history.

(56) References Cited

U.S. PATENT DOCUMENTS

| | | | |
|---|---|---|---|
| 4,853,726 A * | 8/1989 | Kawamura et al. | 396/299 |
| 5,283,606 A * | 2/1994 | Konno et al. | 396/299 |
| 5,950,035 A * | 9/1999 | Sakamoto et al. | 396/543 |
| 6,067,424 A * | 5/2000 | Shono | 396/297 |
| 7,054,551 B2 * | 5/2006 | Liao et al. | 396/299 |
| 2002/0089591 A1 | 7/2002 | Kurahashi | |
| 2002/0144882 A1 * | 10/2002 | Yamaguchi | 200/4 |
| 2004/0091260 A1 * | 5/2004 | Kobayashi | 396/543 |
| 2006/0062565 A1 * | 3/2006 | Tsuchida | 396/299 |

FOREIGN PATENT DOCUMENTS

| | | |
|---|---|---|
| CN | 1380668 A | 11/2002 |
| JP | 04-014328 A | 2/1992 |
| JP | 06-023137 A | 3/1994 |
| JP | 09-005814 | 1/1997 |
| JP | 2002-165123 | 6/2002 |
| JP | 2002-165124 | 6/2002 |
| JP | 2007-149705 A | 6/2007 |

* cited by examiner

*Primary Examiner* — Nhan T Tran
*Assistant Examiner* — Tuan Le
(74) *Attorney, Agent, or Firm* — Cowan, Liebowitz & Latman, P.C.

(57) ABSTRACT

An electronic apparatus that enables to realize, with a simple and inexpensive structure, a rotational operation mechanism having rotational operation members of an upper and lower two-tier configuration that can rotate 360 degrees independently from each other. An exterior member forms an exterior section. A tabular member is positioned in and fixed to the exterior member. A hollow shaft is fixed to the tabular member. A first rotational operation member has a shaft section slidably fit in an inner side of the hollow shaft, is supported by the hollow shaft via the shaft section, and rotates slidably with respect to the hollow shaft. A second rotational operation member slidably fits in a hole that pierces through the exterior member and rotates slidably with respect to the exterior member between the first rotational operation member and the exterior member.

13 Claims, 9 Drawing Sheets

ELECTRONIC APPARATUS

BACKGROUND OF THE INVENTION

1. Field of the Invention

The present invention relates to an electronic apparatus including a rotational operation member formed in two tiers.

2. Description of the Related Art

Conventionally, there has been a rotational operation mechanism mounted on an electronic apparatus such as a camera. In the rotational operation mechanism of this type, a mechanism for allowing an upper dial (rotational operation member) and a lower dial (rotational operation member), which are formed in two tiers, to independently rotate about 360 degrees from each other is not put to practical use because of restrictions in size and strength.

Techniques explained below are proposed concerning the rotational operation mechanism. For example, Japanese Laid-Open Patent Publication (Kokai) No. 2002-165124 discloses a rotational operation mechanism in which a diameter of an upper rotational operation member is smaller than a diameter of a lower rotational operation member.

For example, Japanese Laid-Open Patent Publication (Kokai) No. 2002-165123 discloses a rotational operation mechanism in which a rotation angle of an upper rotational operation member is larger than a rotation angle of a lower rotational operation member.

For example, Japanese Laid-Open Patent Publication (Kokai) No. H9-5814 discloses a second rotational operation member that is disposed to overlap a first rotational operation member in a rotation axis direction and can be rotated independently from the first rotational operation member. Further, Japanese Laid-Open Patent Publication (Kokai) No. H9-5814 discloses a lock member that is attached to the second rotational operation member and moved in a radial direction of the second rotational operation member between a lock position for preventing rotation of the second rotational operation member and an unlock position for releasing the prevention of the rotation. In the technique disclosed in Japanese Laid-Open Patent Publication (Kokai) No. H9-5814, the second rotational operation member located below the first rotational operation member cannot rotate 360 degrees. Therefore, the technique is different from an embodiment of the present invention explained later.

In the above described prior art, there exists following problems. As explained above, since the rotational operation mechanism for allowing the upper and lower rotational operation members to independently rotate about 360 degrees from each other in a camera is not put to practical use, restriction in use and heavy stress are imposed on a user.

There is a limit in the number of modes that can be arranged on each of the rotational operation members (the number of modes that the user can select). This limit also restricts design of the rotational operation mechanism. Further, since indicators are respectively arranged on the rotational operation members, kinds of indicators increase. Therefore, visibility is not satisfactory for the user. The rotational operation members are complicated in design.

Springs for creating a feeling of click of the rotational operation members are made of tabular members. Therefore, when a torque of the rotational operation members is changed or adjusted and when the rotational operation members are assembled, cost increases as well as work processes increase.

A space between the rotational operation members is small. The rotational operation members are remote from a component set at a ground (GND) level on a camera main body side. Therefore, when the rotational operation members are made of metal, it is difficult to perform ground connection for protecting the camera from electrostatic destruction.

SUMMARY OF THE INVENTION

The present invention provides an electronic apparatus that can realize, with a simple and inexpensive structure, a rotational operation mechanism having rotational operation members of an upper and lower two-tier configuration that can rotate 360 degrees independently from each other.

Accordingly, the present invention provides an electronic apparatus comprising an exterior member adapted to form an exterior section, a tabular member adapted to be positioned in and fixed to the exterior member, a hollow shaft adapted to be fixed to the tabular member, a first rotational operation member adapted to have a shaft section slidably fit in an inner side of the hollow shaft, be supported by the hollow shaft via the shaft section, and rotate slidably with respect to the hollow shaft, and a second rotational operation member adapted to be slidably fit in a hole that pierces through the exterior member and rotate slidably with respect to the exterior member between the first rotational operation member and the exterior member.

According to the present invention, the first rotational operation member rotates slidably with respect to the hollow shaft and the second rotational operation member rotates slidably with respect to the exterior member between the first rotational operation member and the exterior member. Consequently, it is possible to realize, with a simple and inexpensive structure, a rotational operation mechanism having upper and lower rotational operation members of a two-tier configuration that can rotate 360 degrees independently from each other.

The features and advantages of the invention will become more apparent from the following detailed description taken in conjunction with the accompanying drawings.

DESCRIPTION OF THE EMBODIMENTS

An embodiment of the present invention is explained below with reference to the accompanying drawings.

Figure 1:
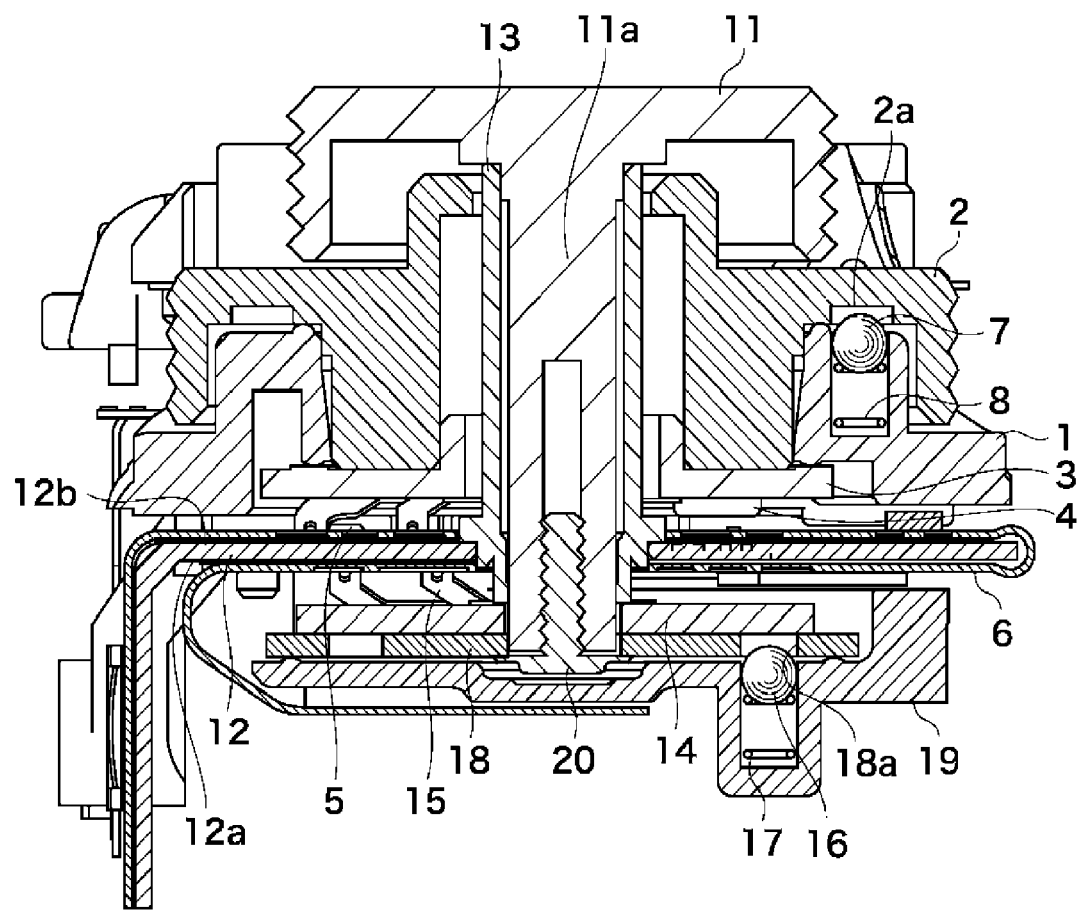
FIG. 1 is a schematic longitudinal sectional view showing a configuration of a rotational operation mechanism mounted on a camera as an image pickup apparatus according to an embodiment of the present invention.
Figure 2:
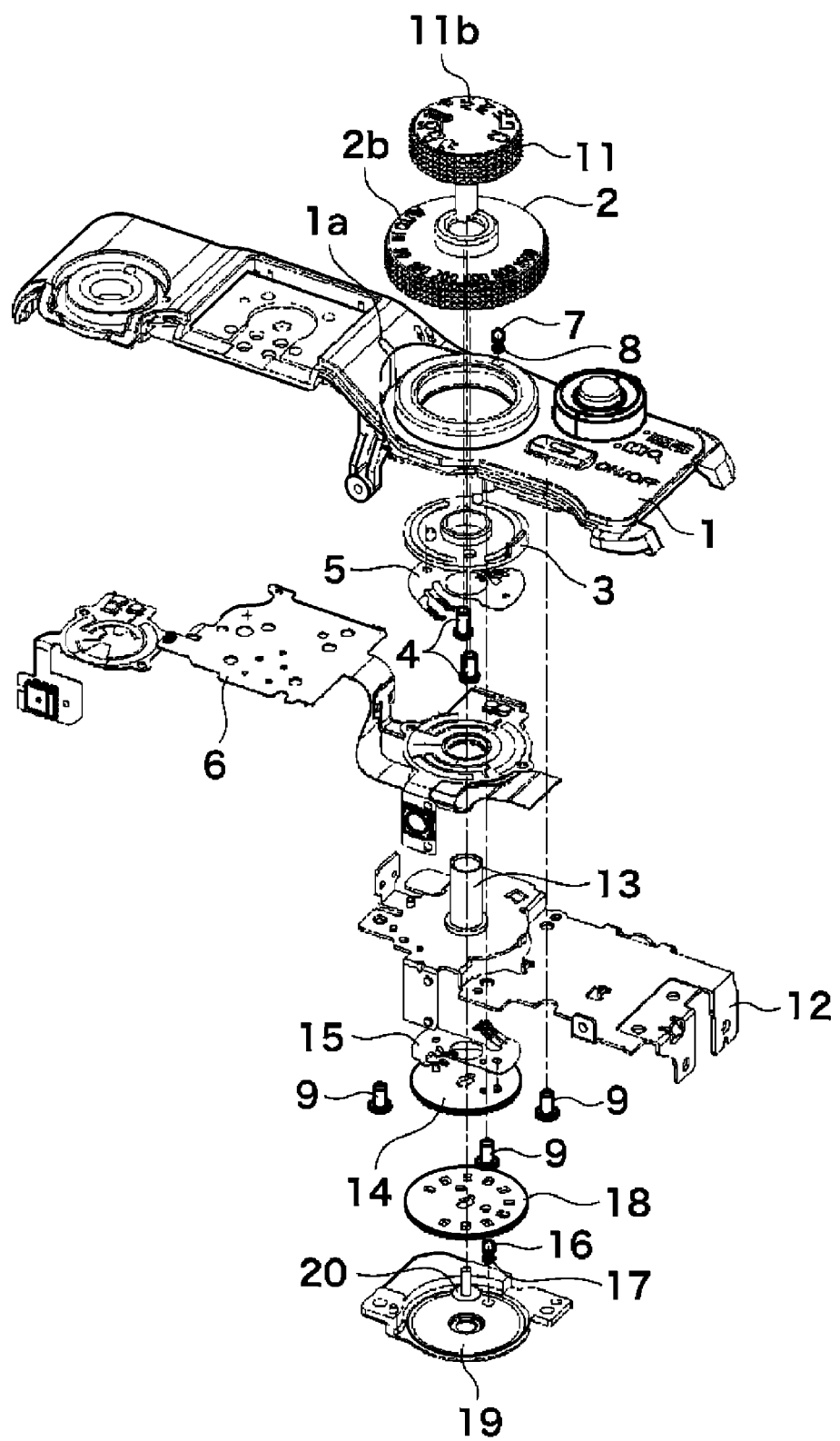
FIG. 2 is a disassembled perspective view showing a first rotational operation member and a second rotational operation member.
Figure 3:
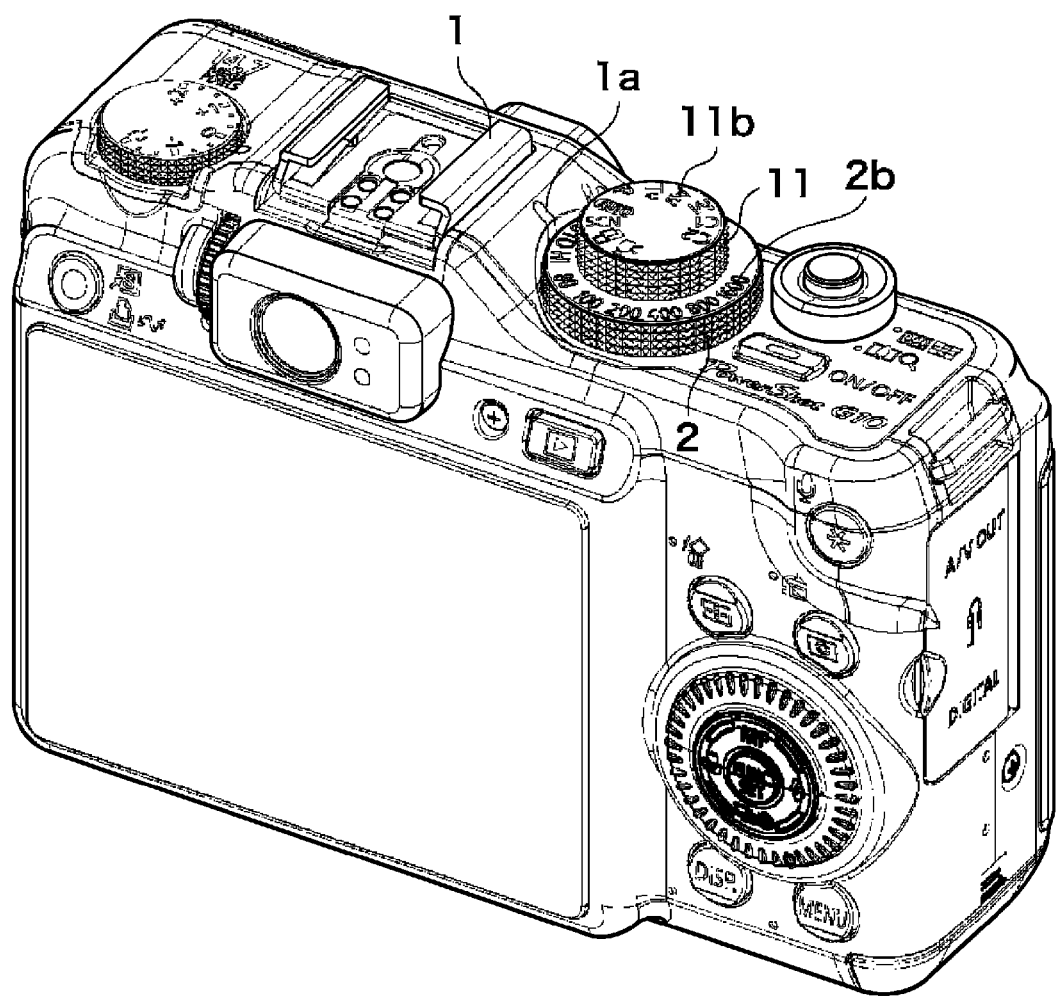
FIG. 3 is a perspective view showing an external appearance of the camera.
Figure 4:
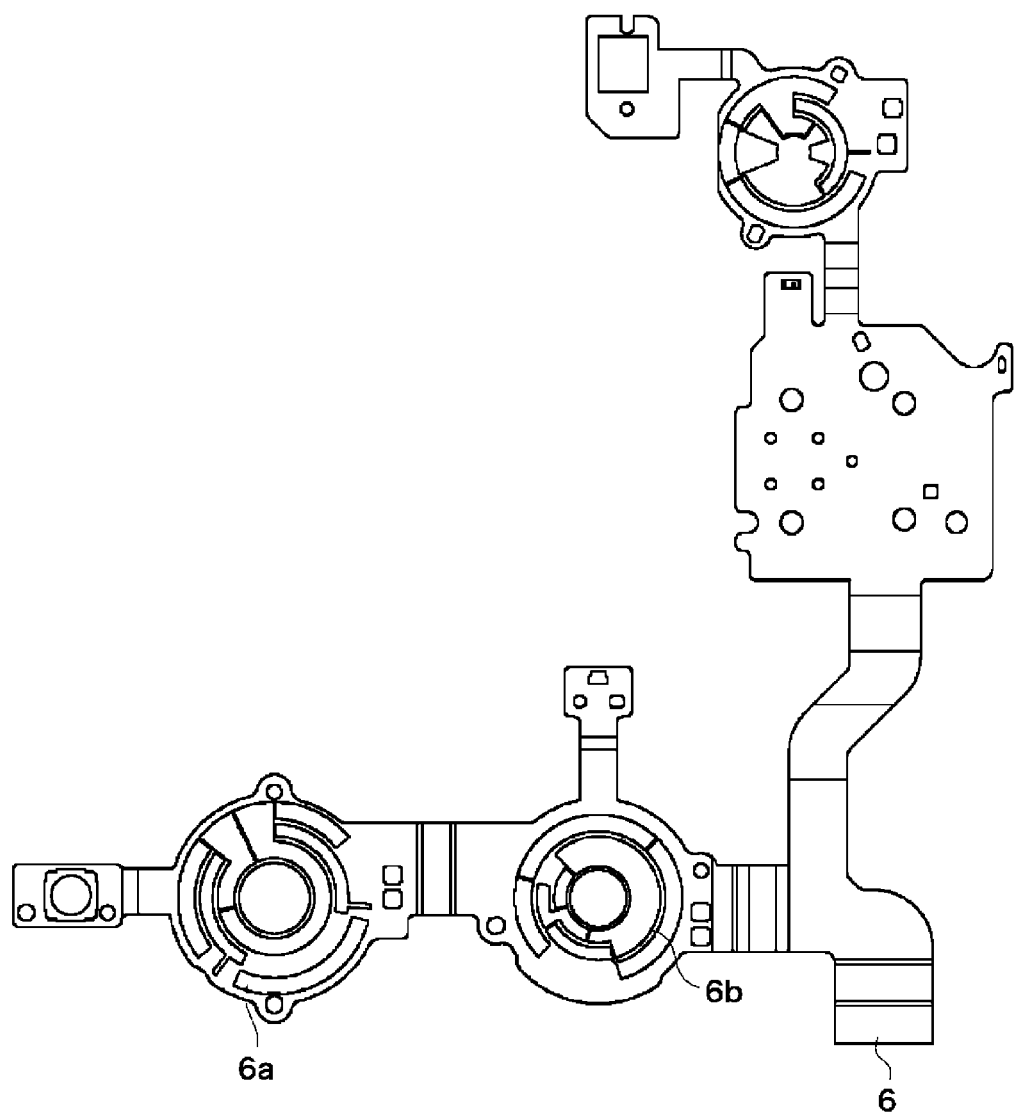
FIG. 4 is a development view showing a pattern substrate.
Figure 5:
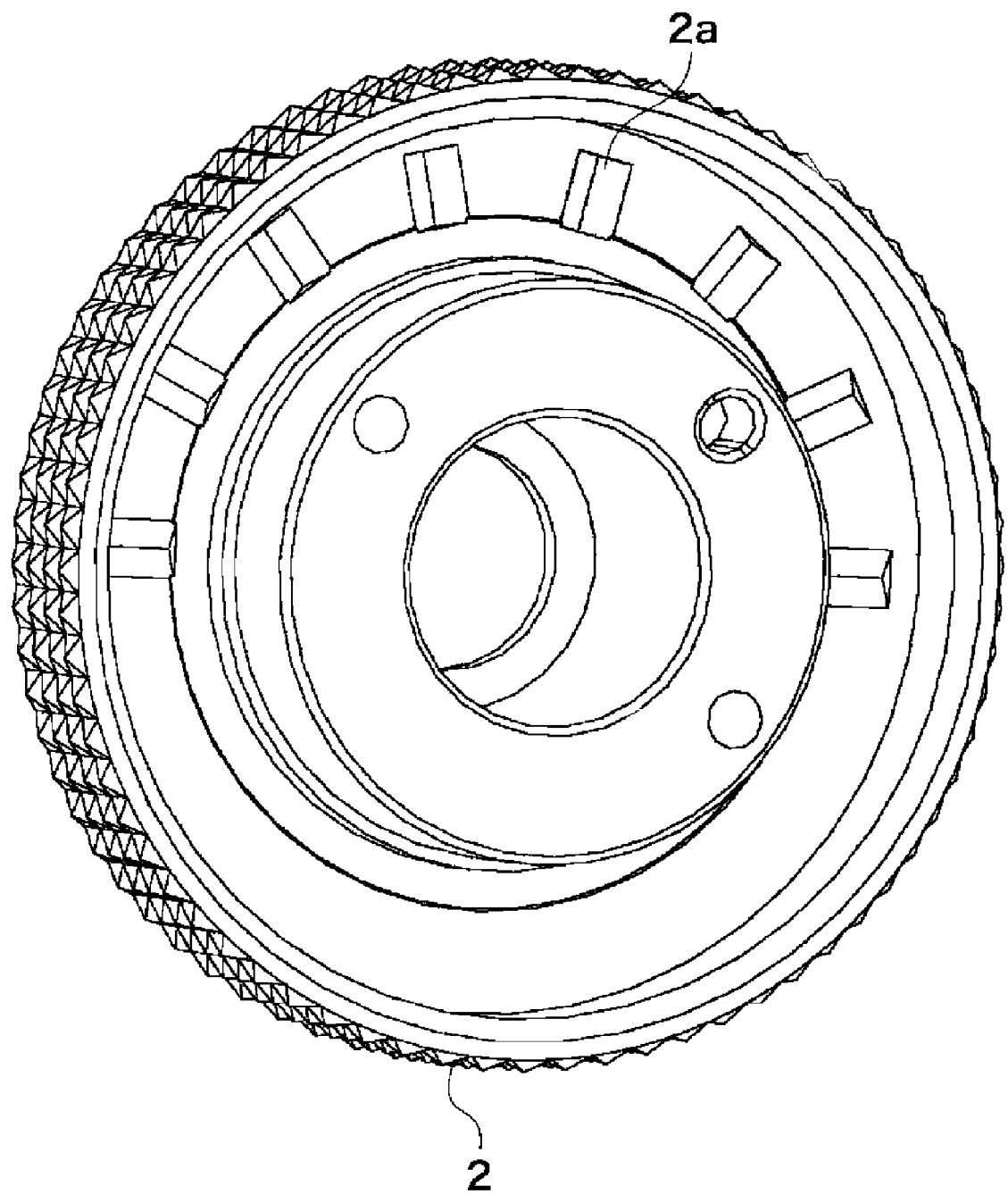
FIG. 5 is a perspective view showing the second rotational operation member.
Figure 6:
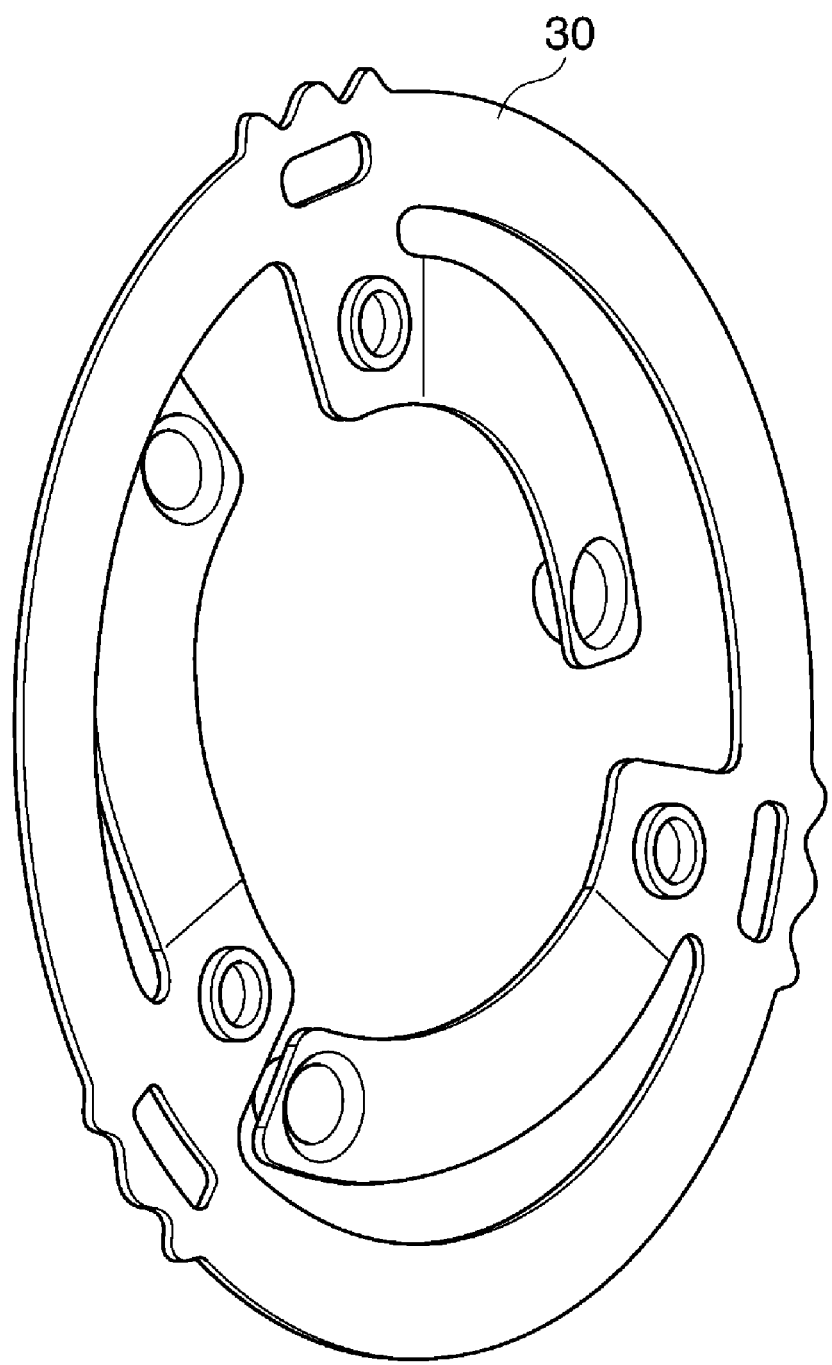
FIG. 6 is a perspective view showing a conductive member.
Figure 7:
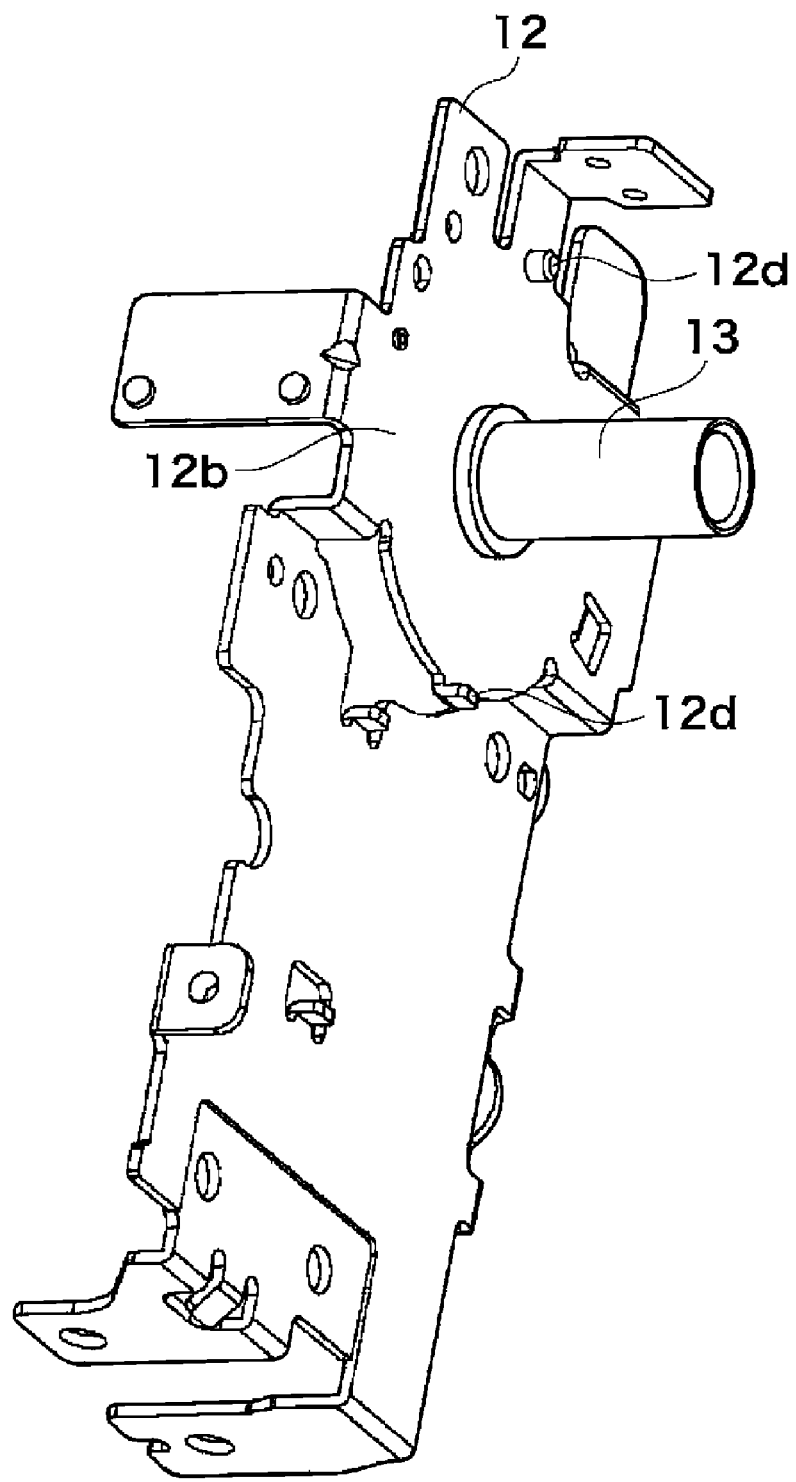
FIG. 7 is a perspective view showing a state of a tabular member viewed from a front side.
Figure 8:
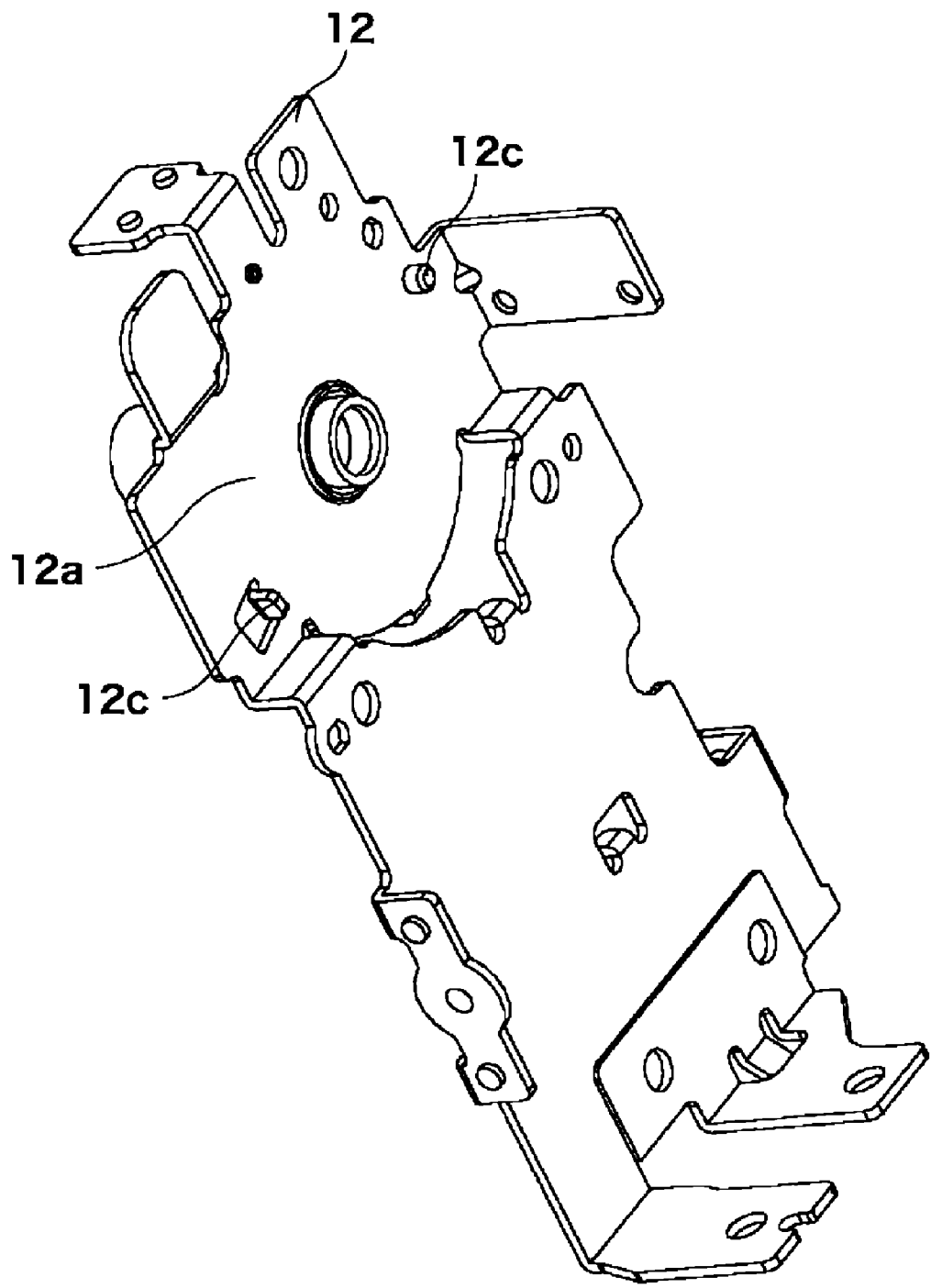
FIG. 8 is a perspective view showing a state of the tabular member viewed from a rear side.

FIG. 1 is a schematic longitudinal sectional view showing a configuration of a rotational operation mechanism mounted on a camera as an image pickup apparatus according to an embodiment of the present invention. FIG. 2 is a disassembled perspective view showing the rotational operation mechanism. FIG. 3 is a perspective view showing an external appearance of the camera. FIG. 4 is an development view showing a pattern substrate. FIG. 5 is a perspective view showing a second rotational operation member. FIG. 6 is a perspective view showing a conductive member. FIG. 7 is a perspective view showing a state of a tabular member viewed from a front side. FIG. 8 is a perspective view showing a state of the tabular member viewed from a rear side. In the figures, members denoted by the same reference numerals and signs represent the same members.

In FIGS. 1 to 8, the rotational operation mechanism of the camera includes an exterior member 1, a first rotational operation member 11, a second rotational operation member 2, a first holder 14, a second holder 3, a tabular member 12, a hollow shaft 13, a first contact piece 15, a second contact piece 5, a pattern substrate 6, and a conductive member 30. In the rotational operation mechanism, the first rotational operation member 11, the second rotational operation member 2, the second holder 3, and the first holder 14 are arranged in this order from an outer side to an inner side of the camera (along an axial direction of the hollow shaft 13).

The exterior member 1 forms an exterior section as an external appearance of the camera. The exterior member 1 is fixed to a chassis, which forms a frame of the camera, or a cover, which forms another exterior section, by a screw or the like (the chassis, the cover, and the screw are not shown in the figure) An indicator 1a as a mark to be aligned with indicators of each of the first rotational operation member 11 and the second rotational operation member 2 is provided in the exterior member 1. In this embodiment, the indicator 1a includes a window of, for example, a milky-white color formed separately from the exterior member 1 and a publicly-known LED disposed right below the window. A user can recognize the indicator 1a even if the LED is off.

The second rotational operation member 2 is a lower rotational operation member in rotational operation members of an upper and lower two-tier configuration. The second rotational operation member 2 is slidably fit in a hole formed to pierce through the exterior member 1 and rotates slidably with respect to the exterior member 1 between the first rotational operation member 11 and the exterior member 1. In a surface of the second rotational operation member 2 opposed to the exterior member 1, a trough-shaped groove 2a is formed to correspond to a stop position of the second rotational operation member 2. The trough-shaped groove 2a has slopes on which a second ball 7 can move (rise and fall). On a disc surface of the second rotational operation member 2, indicators 2b (plural numerical values indicating ISO sensitivities) are provided along the circumferential direction (see FIG. 3).

The second holder 3 is tightened to the second rotational operation member 2 by screws 4 and rotates integrally with the second rotational operation member 2. The second contact piece 5 is a member that is bonded to the second holder 3 by thermal welding and is electrically brought into contact with the pattern substrate 6. The second contact piece 5 rotates integrally with the second rotational operation member 2 and the second holder 3. A second holder unit includes the second holder 3 and the second contact piece 5.

The second ball 7 is a member for stopping the second rotational operation member 2 in a desired position during the rotation of the second rotational operation member 2 and creating a feeling of click by fitting in the trough-shaped groove 2a of the second rotational operation member 2. The second ball 7 is arranged between the exterior member 1 and the second rotational operation member 2. A second spring 8 is a publicly-known compression spring. When the user does not rotate the second rotational operation member 2, the second ball 7 is pushed in the trough-shaped groove 2a of the second rotational operation member 2 by the urging force of the second spring 8. The second rotational operation member 2 and the second holder unit are rotatably and slidably fixed by the screws 4 with the exterior member 1 held therebetween.

In this embodiment, the second rotational operation member 2 is a member for switching ISO sensitivities and is adapted such that the user can select ISO sensitivities during shooting. The second rotational operation member 2 can rotate 360 degrees (full circumference). On the disc surface of the second rotational operation member 2, ISO sensitivities that the user can select are printed along the circumferential direction (see FIG. 3). When the user rotates the second rotational operation member 2, the second ball 7 pushed in the trough-shaped groove 2a of the second rotational operation member 2 by the urging force of the second spring 8 starts to fall along the slopes of the trough-shaped groove 2a of the second rotational operation member 2.

When the user sets the indicator 2b of the second rotational operation member 2 on the indicator 1a of the exterior member 1 to stop the rotation of the second rotational operation member 2, the second ball 7 rises along the slopes of the trough-shaped groove 2a of the second rotational operation member 2. Accordingly, the second ball 7 is stopped by two slopes arranged along a moving direction in the trough-shaped groove 2a of the second rotational operation member 2 and arranged to form a trough that narrows upward. In this case, a stop position of the second ball 7 and a printed indication of ISO sensitivity selectable by the user coincide with each other. The user can feel a feeling of click transmitted to a hand according to the rise and fall of the second ball 7.

The first rotational operation member 11 is a rotational operation member that forms an upper rotational operation member in the rotational operation members of the upper and lower two-tier configuration. On a disc surface of the first rotational operation member 11, indicators 11b (characters and signs indicating various modes usable in the camera) are provided along the circumferential direction (see FIG. 3).

The tabular member 12 is positioned by a positioning dowel (not shown in the figure) and locked to the exterior member 1 by screws 9. The hollow shaft 13 is locked to the tabular member 12. In this embodiment, both the tabular member 12 and the hollow shaft 13 are formed of metal and locked by publicly-known caulking. The tabular member 12 and the hollow shaft 13 may be integrally formed by molding. The tabular member 12 is electrically set in contact with the ground level of the camera main body by a screw (not shown in the figure).

The first rotational operation member 11 has a shaft section 11a that slidably fits in a hole (an inner side) in the axial direction of the hollow shaft 13. The first rotational operation member 11 is supported by the hollow shaft 13 via the shaft section 11a and rotates slidably with respect to the hollow shaft 13. The first holder 14 is positioned in a rotating direction by publicly-known two-side chamfering in a small diameter portion at the distal end of the shaft section 11a of the first rotational operation member 11 and rotates integrally with the first rotational operation member 11. The first contact piece 15 is a member that is bonded to the first holder 14 by thermal welding and is electrically brought into contact with the pattern substrate 6. The first contact piece 15 rotates integrally with the first rotational operation member 11 and the first holder 14. A first holder unit includes the first holder 14 and the first contact piece 15.

The first ball 16 is a member for stopping the first rotational operation member 11 in a desired position during the rotation of the first rotational operation member 11 and creating a feeling of click by fitting in a slit hole 18a explained later of a click plate 18. The first spring 17 is a publicly-known compression spring. The click plate 18 is provided in a position corresponding to a stop position of the first rotational operation member 11 and has a slit hole 18a having width that allows the first ball 16 to move forward and backward but does not allow the first ball 16 to pass through (allows the first ball 16 to fit in). The click plate 18 is placed over a surface on a side of the first holder 14 not fixed with the first contact piece 15. The click plate 18 is fixed to the first rotational operation member 11.

The first rotational operation member 11 is tightened by a screw 20 together with the first holder unit and the click plate 18 with the exterior member 1 held therebetween. The first rotational operation member 11 is subjected to the two-side chamfering as explained above and serves to stop the rotation of the first holder unit, which includes the first holder 14 and the first contact piece 15, and the click plate 18.

A pressing plate 19 prevents the first rotational operation member 11 and the first holder unit from coming into contact with surrounding members and the pattern substrate 6 and prevents oil for securing sliding from scattering when the first rotational operation member 11 and the first holder unit rotate. The pressing plate 19 also prevents breakage of the contact pieces when the rotational operation mechanism (unit) is transported. In this embodiment, the pressing plate 19 is made of a transparent member to make it easy to check the movement of the first and second rotational operation members and the behavior of the spring when the unit is completed.

In this embodiment, the first rotational operation member 11 is a member for switching a mode of the camera and is adapted such that the user can select various modes usable in the camera. The first rotational operation member 11 can rotate 360 degrees (full circumference). Consequently, the user can instantaneously shift a mode to a mode adjacent thereto in the various modes displayed on the disc surface of the first rotational operation member 11.

When the user selects a mode of the camera or selects ISO sensitivity, the user can switch the mode or the ISO sensitivity by setting an indicator of the first rotational operation member 11 or an indicator of the second rotational operation member 2 on the indicator 1a of the exterior member 1.

It is possible to change contact force between the first ball 16 and the click plate 18 and contact force between the second ball 7 and the second rotational operation member 2 by adjusting wire diameters, outer diameters, natural lengths, materials, and the like of the first spring 17 and the second spring 8, respectively. As a result, it is possible to change and adjust rotation torques of the first rotational operation member 11 and the second rotational operation member 2, respectively.

The pattern substrate 6 is a publicly-known substrate on which a first pattern 6b set in contact with the first contact piece 15 and a second pattern 6a set in contact with the second contact piece 5 (see FIG. 4) are formed on the same surface (one side). The pattern substrate 6 is bent with the tabular member 12 held therein such that the first pattern 6b is opposed to and set in contact with the first contact piece 15 and the second pattern 6a is opposed to and set in contact with the second piece 5. Further, the pattern substrate 6 is arranged between the first holder 14 and the second holder 3 in the axial direction of the hollow shaft 13.

A section where the first pattern 6b is formed on the pattern substrate 6 is fixed on a first surface 12a of the tabular member 12. A section where the second pattern 6a is formed on the pattern substrate 6 is fixed on a second surface 12b as a rear surface of the first surface 12a of the tabular member 12.

On the first surface 12a of the tabular member 12, a first positioning section 12c for positioning the section where the first pattern 6b is formed on the pattern substrate 6 is formed (see FIG. 8). On the second surface 12b of the tabular member 12, a second positioning section 12d for positioning the section where the second pattern 6a is formed on the pattern substrate 6 is formed (see FIG. 7).

The pattern substrate 6 is positioned by a shaft caulked to the tabular member 12, the first positioning section 12c, and the second positioning section 12d such as to hold the tabular member 12 in a bent portion and is fixed to the tabular member 12 by a not-shown double-faced tape. The pattern substrate 6 is electrically connected to a central processing unit (CPU: not shown in the figure) mounted on the camera. The first pattern 6b and the second pattern 6a of the pattern substrate 6 are sections where a copper foil is exposed. The first pattern 6b and the second pattern 6a are adapted such that electrical contact and non-contact are switched with respect to the first contact piece 15 and the second contact piece 5, respectively.

The pattern substrate 6 is arranged in a state in which the first pattern 6b is set in contact with the first contact piece 15, the second pattern 6a is set in contact with the second contact piece 5, and the pattern substrate 6 is bent to be turned around to a lower side of the pressing plate 19 (see FIG. 1). With this configuration, it is possible to lay out the pattern substrate 6 without restricting the rotation of the first rotational operation member 11 and the second rotational operation member 2 with the pressing plate 19. This makes it unnecessary to worry about the lifting of the pattern substrate 6 bent to be turned around to the lower side of the pressing plate 19 and the contact of the pattern substrate 6 and the first rotational operation members 11 and the second rotational operation member 2. Therefore, it is easy to assemble the rotational operation mechanism.

Figure 9:
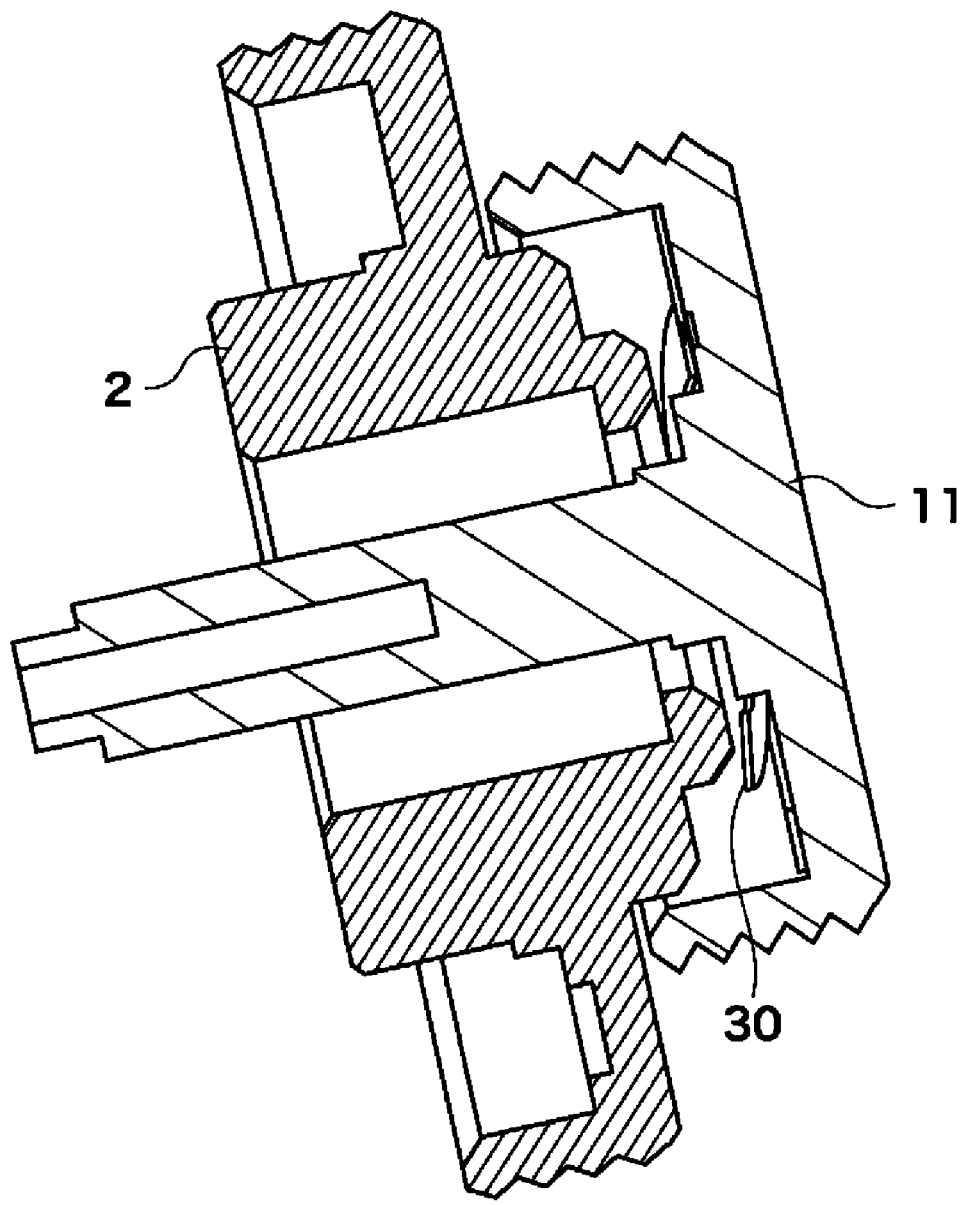
FIG. 9 is a sectional view showing a state of the conductive member incorporated between the first rotational operation member and the second rotational operation member.

The conductive member 30 is a leaf spring pressed in and arranged between the first rotational operation member 11 and the second rotational operation member 2, i.e., on an inner side of the first rotational operation member 11. The conductive member 30 electrically connects the first rotational operation member 11 and the second rotational operation member 2 (see FIGS. 6 and 9: not shown in FIG. 1). The first rotational operation member 11 is electrically connected to the tabular member 12 via the hollow shaft 13 and is finally set the same as a ground level of the pattern substrate 6. With this configuration, even when static electricity sparks to the first rotational operation member 11 or the second rotational operation member 2, the static electricity less easily affects signal lines near the members. Therefore, durability of the entire camera is improved.

As explained above, according to this embodiment, advantages explained below are realized. Since the first rotational operation member 11 and the second rotational operation member 2 are adapted to be rotatable 360 degrees (full circumference) independently from each other, it is possible to arrange, in association with each of the members, a large number of modes (functions) that can be switched by the camera. Therefore, there is an advantage that a degree of freedom in design increases.

The first contact piece 15 that rotates integrally with the first rotational operation member 11 and the second contact piece 5 that rotates integrally with the second rotational operation member 2 are set in contact with the first and second patterns of the pattern substrate 6 with one tabular member 12 held therebetween. The first and second positioning sections for positioning the first and second patterns of the pattern substrate 6 are respectively provided in the first surface 12a and the second surface 12b of the tabular member 12. This enables to prevent positional shift on the rotation axis of the first and second rotational operation members. Further, bending of the pattern substrate 6 and the tabular member 12 due to contact piece pressures is offset between the contact piece pressures. Therefore, there is an advantage that electric contact is stabilized and reliability is improved.

When the first rotational operation member 11 and the second rotational operation member 2 are made of metal, the hollow shaft 13 locked to the tabular member 12 by caulking is made of metal. Consequently, when it is desired to drop the first and second rotational operation members to the ground as measures against static electricity, a contact for connection only has to be disposed in a space between the first and second rotational operation members. Therefore, there is an advantage that it is easy to prevent breakage of a circuit due to static electricity.

The first rotational operation member 11 rotates slidably with respect to the hollow shaft 13 and the second rotational operation member 2 rotates slidably with respect to the exterior member 1. In other words, since the first rotational operation member 11 and the second rotational operation member 2 are held rotatably with respect to the exterior member 1 independently from each other, the first rotational operation member 11 and the second rotational operation member 2 are less easily affected by component accuracy, shift in assemble work, and the like. Adjustment of the first rotational operation member 11 and the second rotational operation member 2 is unnecessary. Consequently, even when an inexperienced worker assembles the rotational operation mechanism, it is easy to secure stable operability in the rotational operation mechanism. As a result, it is possible to reduce cost.

In summary, it is possible to realize, with a simple and inexpensive structure, the rotational operation mechanism having the first rotational operation member 11 and the second rotational operation member 2 of the upper and lower two-tier configuration that can rotate 360 degrees independently from each other.

In the example explained in the embodiment described above, the first and second rotational operation members are electrically connected to each other by using the conductive member 30 (the leaf spring). However, the present invention is not limited to this. The first and second rotational operation members may be electrically connected to each other by using a compression spring.

In the example explained in the embodiment described above, the first and second rotational operation members are electrically connected to each other. However, the present invention is not limited to this. The first and second rotational operation members may be electrically connected to the hollow shaft 13 and the tabular member 12.

In the example explained in the embodiment described above, the rotational operation mechanism is mounted on the image pickup apparatus (the camera). However, the present invention is not limited to this. It is also possible to mount the rotational operation mechanism according to the present invention on an electronic apparatus having a function of setting various modes by operating rotational operation members of a two-tire configuration other than the image pickup apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-230894 filed Sep. 9, 2008, which is hereby incorporated by reference herein in its entirety.

What is claimed is:

1. The electronic apparatus comprising:
    an exterior member adapted to form an exterior section;
    an interior member adapted to be fixed to the exterior member;
    a hollow shaft adapted to be fixed to the interior member;
    a first rotational operation member adapted to have a shaft section inserted into an inner side of the hollow shaft, and rotate with respect to the hollow shaft;
    a first holder adapted to rotate integrally with the first rotational operation member;
    a first contact piece adapted to be fixed to the first holder;
    a second rotational operation member adapted to rotate with respect to the exterior member between the first rotational operation member and the exterior member;
    a second holder adapted to rotate integrally with the second rotational operation member; and
    a second contact piece adapted to be fixed to the second holder; and
    an electronic substrate adapted to have a first electrode pattern set in contact with the first contact piece and a second electrode pattern set in contact with the second contact piece,
    wherein the electronic substrate is arranged between the first holder and the second holder in the axial direction of the hollow shaft.

2. The electronic apparatus according to claim 1, wherein the first electrode pattern and the second electrode pattern are formed on one side of the electronic substrate,
    wherein the electronic substrate is bent with the interior member held therein such that the first electrode pattern is opposed to and set in contact with the first contact piece and the second electrode pattern is opposed to and set in contact with the second contact piece, and
    wherein the electronic substrate is arranged between the first holder and the second holder in the axial direction of the hollow shaft.

3. The electronic apparatus according to claim 2,
    wherein a section where the first electrode pattern is formed on the electronic substrate is fixed on a first surface of the interior member, and
    a section where the second electrode pattern is formed on the electronic substrate is fixed on a second surface as a rear surface of the first surface of the interior member.

4. The electronic apparatus according to claim 3,
    wherein a first positioning section that positions the section where the first electrode pattern is formed on the electronic substrate is formed on the first surface of the interior member, and
    wherein a second positioning section that positions the section where the second electrode pattern is formed on the electronic substrate is formed on the second surface of the interior member.

5. The electronic apparatus according to claim 1, further comprising:

a click plate adapted to have a slit in a position corresponding to a stop position of the first rotational operation member; and a first ball adapted to fit in the slit of the click plate to stop the first rotational operation member, wherein the click plate is fixed to the first rotational operation member such that the click plate is opposed to a surface on a side not fixed with the first contact piece in the first holder.

6. The electronic apparatus according to claim 5, wherein a trough-shaped groove is formed in a position corresponding to a stop position of the second rotational operation member on a surface opposed to the exterior member in the second rotational operation member, and wherein the electronic apparatus further includes a second ball adapted to be arranged between the exterior member and the second rotational operation member and fit in the trough-shaped groove of the second rotational operation member to stop the second rotational operation member.

7. The electronic apparatus according to claim 1, further comprising:

a conductive member adapted to be arranged between the first rotational operation member and the second rotational operation member and electrically connect the first rotational operation member and the second rotational operation member.

8. The electronic apparatus according to claim 1, wherein the electronic apparatus includes an image pickup apparatus.

9. The electronic apparatus comprising:

an exterior member adapted to form an exterior section;

an interior member adapted to be positioned in and fixed to the exterior member;

a first rotational operation member adapted to rotate with respect to the exterior member;

a first holder adapted to rotate integrally with the first rotational operation member;

a first contact piece adapted to be fixed to the first holder;

a second rotational operation member adapted to rotate with respect to a same direction of a rotational axis of the first rotational operation member;

a second holder adapted to rotate integrally with the second rotational operation member;

a second contact piece adapted to be fixed to the second holder;

an electronic substrate adapted to have a first electrode pattern set in contact with the first contact piece and a second electrode pattern set in contact with the second contact piece, wherein the electronic substrate is arranged on the interior member such that the first electrode pattern is opposed to and set in contact with the first contact piece and the second electrode pattern is opposed to and set in contact with the second contact piece, and wherein the interior member and the electronic substrate are sandwiched between the first holder and the second holder.

10. The electronic apparatus according to claim 9, wherein the first electrode pattern and the second electrode pattern are formed on one side of the electronic substrate, wherein the electronic substrate is bent along the interior member such that the first electrode pattern is fixed on a first surface of the interior member and the first electrode pattern is fixed on a second surface of the interior member as a rear surface of the first surface of the interior member.

11. The electronic apparatus according to claim 9, further comprising:

a click plate adapted to have a slit in a position corresponding to a stop position of the first rotational operation member; and a first ball adapted to fit in the slit of the click plate to stop the first rotational operation member, wherein the click plate is fixed to the first rotational operation member such that the click plate is opposed to a surface on a side not fixed with the first contact piece in the first holder.

12. The electronic apparatus according to claim 11, wherein a trough-shaped groove is formed in a position corresponding to a stop position of the second rotational operation member on a surface opposed to the exterior member in the second rotational operation member, and wherein the electronic apparatus further includes a second ball adapted to be arranged between the exterior member and the second rotational operation member and fit in the trough-shaped groove of the second rotational operation member to stop the second rotational operation member.

13. The electronic apparatus according to claim 9, further comprising:

a conductive member adapted to be arranged between the first rotational operation member and the second rotational operation member and electrically connect the first rotational operation member and the second rotational operation member.

* * * * *